(12) United States Patent
Kinoshita

(10) Patent No.: US 8,751,060 B2
(45) Date of Patent: Jun. 10, 2014

(54) TRAVELING VEHICLE SYSTEM AND METHOD FOR CONTROLLING TRAVELING BY TRAVELING VEHICLE SYSTEM

(75) Inventor: Yuichiro Kinoshita, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 217 days.

(21) Appl. No.: 12/993,506

(22) PCT Filed: Mar. 10, 2009

(86) PCT No.: PCT/JP2009/054498
§ 371 (c)(1),
(2), (4) Date: Jan. 4, 2011

(87) PCT Pub. No.: WO2009/142051
PCT Pub. Date: Nov. 26, 2009

(65) Prior Publication Data
US 2011/0106341 A1    May 5, 2011

(30) Foreign Application Priority Data

May 22, 2008   (JP) .................................. 2008-134063

(51) Int. Cl.
*G05D 1/00*   (2006.01)
*G07C 5/00*   (2006.01)
*G01S 13/93*   (2006.01)

(52) U.S. Cl.
CPC .................................. *G07C 5/008* (2013.01);
*G01S 13/931* (2013.01)
USPC ........ 701/2; 701/1; 701/20; 701/23; 701/301;
340/901; 340/903; 340/435; 340/436; 104/298

(58) Field of Classification Search
USPC ........... 701/2, 1, 19, 20, 23, 24, 26, 300, 301;
104/298; 340/903, 989, 435, 436, 467
See application file for complete search history.

(56) References Cited

U.S. PATENT DOCUMENTS 5,127,599 A * 7/1992 Veraart ..................... 246/182 R
5,473,233 A * 12/1995 Stull et al. ..................... 318/587

(Continued)

FOREIGN PATENT DOCUMENTS

JP    62-27805 A    2/1987
JP    62-140116 A   6/1987

(Continued)

OTHER PUBLICATIONS

Official Communication issued in International Patent Application No. PCT/JP2009/054498, mailed on Jun. 16, 2009.

*Primary Examiner* — Thomas Tarcza
*Assistant Examiner* — Tyler J Lee
(74) *Attorney, Agent, or Firm* — Keating & Bennett, LLP

(57) ABSTRACT

In a traveling vehicle system, traveling vehicles travel along a travel route under the control of at least one controller. Each of the traveling vehicles includes a first traveling vehicle position determining section arranged to determine a position of the respective traveling vehicle, and a second traveling vehicle position determining section arranged to determine a position of at least one other of the traveling vehicles by communication, and a distance sensor arranged to detect a distance between the respective traveling vehicle and the at least one other of the traveling vehicles. The at least one controller and the traveling vehicles are configured to control velocities of the traveling vehicles in an inter-vehicle control area by determining inter-vehicle distances between the traveling vehicles based on the position of the at least one other of the traveling vehicles obtained by the communication in the second traveling vehicle position determining section, and the position of the respective traveling vehicle determined by the first traveling vehicle position determining section, and to control the velocities of the traveling vehicles in areas of the traveling route other than in the inter-vehicle control area based on distances detected by the distance sensor.

4 Claims, 3 Drawing Sheets

(56) References Cited

U.S. PATENT DOCUMENTS

| | | | |
|---|---|---|---|
| 5,761,630 A * | 6/1998 | Sekine et al. | 701/301 |
| 6,115,652 A * | 9/2000 | Sato et al. | 701/28 |
| 6,129,025 A * | 10/2000 | Minakami et al. | 104/88.01 |
| 6,957,138 B2 * | 10/2005 | Kondo et al. | 701/96 |
| 7,302,319 B2 * | 11/2007 | Wu | 701/19 |
| 2006/0229803 A1 * | 10/2006 | Shimamura | 701/200 |
| 2006/0271252 A1 * | 11/2006 | Hori et al. | 701/23 |
| 2009/0099715 A1 * | 4/2009 | Cho et al. | 701/20 |

FOREIGN PATENT DOCUMENTS

| | | |
|---|---|---|
| JP | 63-73304 A | 4/1988 |
| JP | 4-218811 A | 8/1992 |
| JP | 5-303423 A | 11/1993 |
| JP | 11-119830 A | 4/1999 |
| JP | 2001-216023 A | 8/2001 |
| JP | 2005-284779 A | 10/2005 |
| JP | 2008-9533 A | 1/2008 |

\* cited by examiner

TRAVELING VEHICLE SYSTEM AND METHOD FOR CONTROLLING TRAVELING BY TRAVELING VEHICLE SYSTEM

BACKGROUND OF THE INVENTION

1. Field of the Invention

The present invention relates to traveling vehicles such as an overhead traveling vehicle (OHT), an automated guided vehicle (AGV), a rail guided vehicle (RGV), or the like. In particular, the present invention relates to a technique of implementing control in a diverging section or a merging section of such a traveling vehicle.

2. Description of the Related Art

In a technique disclosed in JP2005-284779A, a collision prevention sensor is provided in a traveling vehicle such as an overhead traveling vehicle to monitor a leading traveling vehicle for preventing interference with the leading traveling vehicle. Further, a ground controller restricts entry of the traveling vehicle into a diverging section and a merging section to ensure that only one traveling vehicle can enter the diverging section or the merging section. Hereinafter, control where the ground controller's permission is required for the traveling vehicle to enter a certain area, and the number of traveling vehicles that can be present in the certain area is limited to one or less is referred to as the blocking control. Further, an area where entry of the traveling vehicle is restricted by blocking control is referred to as the blocking area.

In general, the conventional blocking area is several times longer than the vehicle length of one traveling vehicle for the following reasons. For example, in the case of the diverging section, it is difficult to detect a traveling vehicle diverging from the diverging section by a collision prevention sensor from a position upstream of the diverging section. Further, it is difficult for a traveling vehicle in a curve segment at the exit of the diverging section to monitor traveling vehicles in a straight segment downstream of the diverging section by the collision prevention sensor. Likewise, in the case of the merging section, it is difficult for a traveling vehicle curving at an entrance of the merging section for entering the merging section, to detect traveling vehicles in the merging section using the collision prevention sensor. Therefore, a region upstream of the merging section is also included in the blocking area. Further, it is difficult for a traveling vehicle curving in the merging section to detect traveling vehicles at the exit of the merging section by the collision prevention sensor. Therefore, a region at the merging section is included in the blocking area as well. Under the circumstances, the blocking area becomes large. Since the number of traveling vehicles that can pass through the blocking area per unit time is substantially inversely proportional to the size of the blocking area, the efficiency of the traveling vehicle system is low.

SUMMARY OF THE INVENTION

Preferred embodiments of the present invention provide a system and method to increase the number of traveling vehicles that can pass through a diverging section or a merging section.

According to a preferred embodiment of the present invention, a system for a plurality of traveling vehicles traveling along a travel route including a diverging section and a merging section under control of at least one controller is provided. Each of the traveling vehicles preferably includes a first traveling vehicle position determining section arranged to determine a position of the respective traveling vehicle, and a second traveling vehicle position determining section arranged to determine a position of at least one other of the traveling vehicles by communication.

A certain area of the travel route, which includes a diverging section and a merging section, is designated as a blocking area. An area including the blocking area, which is larger than the blocking area, is designated as an inter-vehicle distance control area.

In the inter-vehicle distance control area, velocity control of the respective traveling vehicle is implemented by determining an inter-vehicle distance between the respective traveling vehicle and the at least one other of the traveling vehicles based on the position of the at least one other of the traveling vehicles obtained by communication and the position of the first traveling vehicle determined by the first traveling vehicle position determining section. The first traveling vehicle is configured to enter the blocking area after obtaining permission from the at least one controller.

Further, according to a preferred embodiment of the present invention, a travel control method in a traveling vehicle system for a plurality of traveling vehicles traveling along a travel route including a diverging section and a merging section under control of at least one controller is provided. The method includes the steps of designating a certain area of the travel route including a diverging section and a merging section as a blocking area; designating an area that includes the blocking area and is larger than the blocking area as an inter-vehicle distance control area; allowing a first traveling vehicle to travel along the travel route, the first traveling vehicle including a distance sensor arranged to detect a distance to a second traveling vehicle ahead of the first traveling vehicle, a first traveling vehicle position determining section arranged to determine a position of the first traveling vehicle, and a second traveling vehicle position determining section arranged to determine a position of the second traveling vehicle by communication; allowing the first traveling vehicle in the inter-vehicle distance control area to determine an inter-vehicle distance between the first and second traveling vehicles from the position of the second traveling vehicle obtained by communication and the position of the first traveling vehicle determined by the first traveling vehicle position determining section to implement velocity control of the first traveling vehicle to avoid interference with the second traveling vehicle; allowing the first traveling vehicle to request permission from the at least one controller before entering into the blocking area, and allowing the first traveling vehicle to enter the blocking area after obtaining the requested permission; and allowing the first traveling vehicle in a travel route other than the inter-vehicle distance control area to implement velocity control of the first traveling vehicle based on the distance determined by the distance sensor to avoid interference with the second traveling vehicle.

In this specification, description regarding the traveling vehicle system is directly applicable to the travel control method.

Preferably, the first traveling vehicle further includes a distance sensor arranged to detect a distance to the second traveling vehicle ahead of the first traveling vehicle, and velocity control of the first traveling vehicle in a travel route other than the inter-vehicle distance control area is implemented based on a distance determined by the distance sensor instead of the position of the second traveling vehicle obtained by communication.

Further, preferably, the first traveling vehicle is configured to request permission from the controller before entering into the merging section, and the controller is configured to provide permissions for entry into the merging section, preferentially to traveling vehicles coming from a same direction regardless of an arrival order of the request, to allow the traveling vehicles coming from the same direction to successively enter the merging section.

In particular, preferably, marks are provided along the travel route and the first traveling vehicle position determining section reads the marks to recognize the position of the first traveling vehicle, the first traveling vehicle further includes a communication section arranged to transmit the position of the first traveling vehicle to the controller on the ground, and the second traveling vehicle position determining section arranged to determine a position of the second traveling vehicle by communication intercepts communication of the transmission to the controller on the ground to obtain the position of the second traveling vehicle.

In a preferred embodiment of the present invention, since the size of the blocking area can be minimized, the number of traveling vehicles that can pass the diverging section or the merging section can be increased, and improvement in the system efficiency is achieved.

Further, in the travel route other than the inter-vehicle distance control area, by implementing only velocity control based on the distance determined by the distance sensor, the control can be simplified since it is not required to obtain the inter-vehicle distance to the leading traveling vehicle by communication.

Further, by giving permissions for entry into the merging section, preferentially to traveling vehicles coming from a same direction regardless of an arrival order of the request, to allow the traveling vehicles coming from the same direction to successively enter the merging section, the number of traveling vehicles that can pass the merging section can be further increased.

The above and other elements, features, steps, characteristics and advantages of the present invention will become more apparent from the following detailed description of the preferred embodiments with reference to the attached drawings.

DESCRIPTION OF THE NUMERALS

Figure 1:
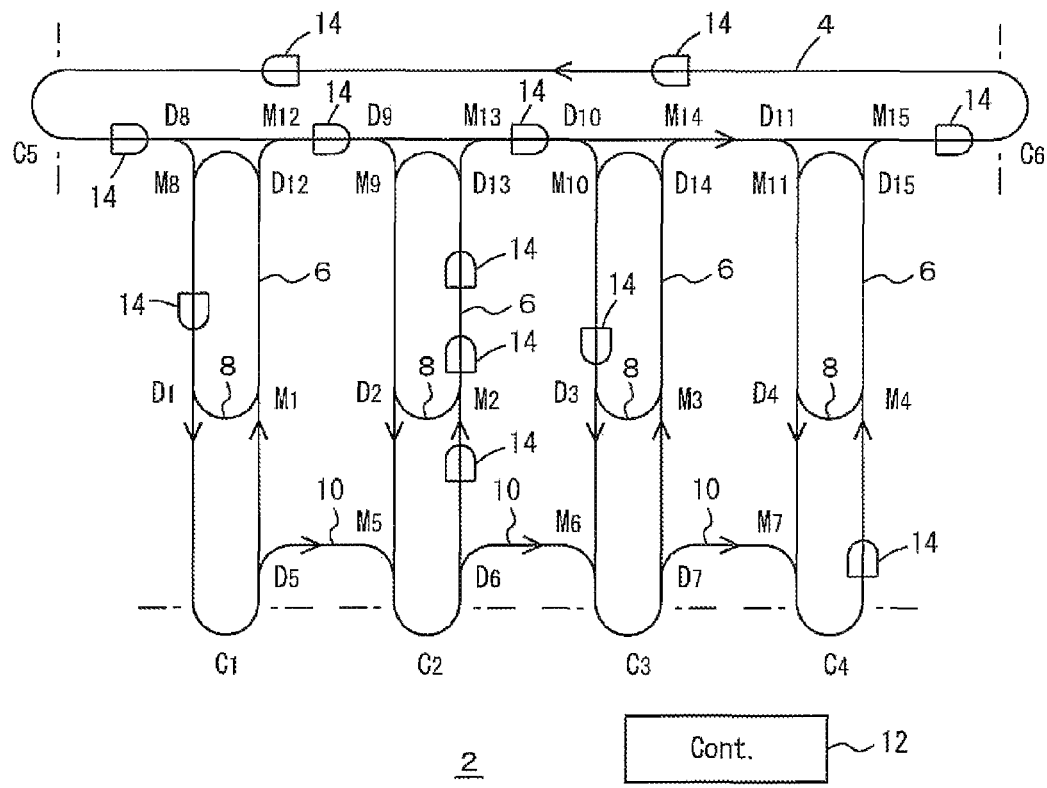
FIG. 1 is a diagram schematically showing a layout of overhead traveling vehicles according to a preferred embodiment of the present invention.

2: overhead traveling vehicle system
4: inter-bay route
6: intra-bay route
8, 10: shortcut
12: ground controller
14: overhead traveling vehicle
20, 30: blocking area
21, 31: inter-vehicle distance control area
22: exit of diverging lane
23: exit of merging lane
24: entrance of diverging lane
32: entrance of merging lane
33: entrance of straight lane
34: exit of merging lane
50: LAN
51: controller body
52: communication interface
53: blocking controller
54: optical distance sensor
55: absolute position sensor
56: mark
61 to 64: permission request from straight lane
65 to 67: permission request from merging lane
68: travel permission pattern in embodiment
69: travel permission pattern in conventional example
D: diverging section
D1 to D15: diverging section
M: merging section
M1 to M15: merging section
C: curve segment
C1 to C4: curve segment

DETAILED DESCRIPTION OF THE PREFERRED EMBODIMENTS

Hereinafter, preferred embodiments for carrying out the present invention will be described.

FIGS. 1 to 6 show an overhead traveling vehicle system 2 according to a preferred embodiment of the present invention. It should be noted that other types of overhead traveling vehicles may be used. For example, rail guided vehicles that travel on the ground or automated guided vehicles that travel without any rail may be used. FIG. 1 shows a non-limiting example of an overall layout of the overhead traveling vehicle system. A reference numeral 4 denotes an inter-bay route of a semiconductor factory or the like, reference numerals 6 denote intra-bay routes, and reference numerals 8 and 10 denote shortcuts. The overall control of the system 2 is implemented by a ground controller 12. A plurality of overhead traveling vehicles 14 travel to circulate along the routes 4, 6 or the like in one direction. The routes 4, 6 include straight segments, diverging sections D1 to D15, merging sections M1 to M15, and curve segments C1 to C4.

Figure 2:
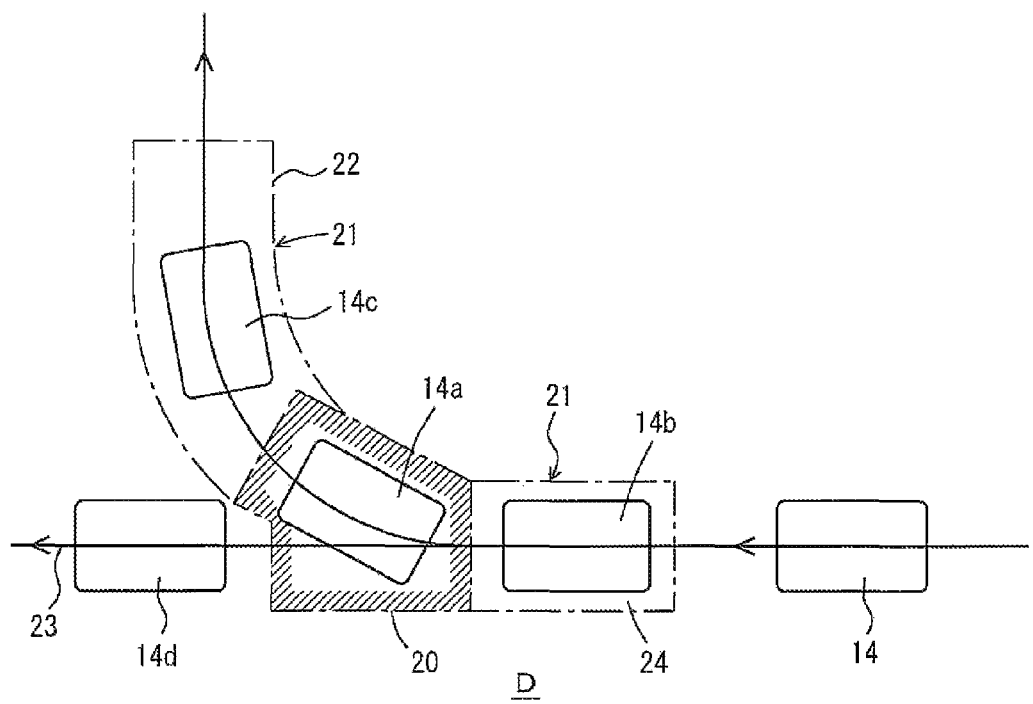
FIG. 2 is a diagram showing a blocking area and an inter-vehicle distance control area in a diverging section in a preferred embodiment of the present invention.

FIG. 2 shows control in the diverging section D. Control in the diverging section D is applicable to each of the diverging sections D1 to D15 shown in FIG. 1. A reference numeral 20 denotes a blocking area. For entry into the blocking area 20, the overhead traveling vehicle 14 requires permission from the ground controller 12. An inter-vehicle distance control area 21 including the blocking area 20, which is larger than the blocking area 20, is provided. The inter-vehicle distance control area 21 is extended along the entrance of the blocking area 20 and an exit 22 of a diverging lane. No inter-vehicle distance control area is provided at an exit 23 of a straight lane. Further, in the inter-vehicle distance control area 21 including the blocking area 20, the overhead traveling vehicle 14 obtains the inter-vehicle distance to a leading traveling vehicle by communication. The overhead traveling vehicle 14 implements velocity control based on the inter-vehicle distance to avoid interference with the leading traveling vehicle. By performing blocking control, two overhead traveling vehicles 14 do not enter the blocking area 20 at the same time.

The overhead traveling vehicle 14 determines an inter-vehicle distance with a leading overhead traveling vehicle preferably by an optical distance sensor 54 as described later, and implements velocity control to avoid interference. This control is implemented in the straight segment. Further, in the curve segment, since it is difficult to detect the leading traveling vehicle by the optical distance sensor, the curve segment is also included in the inter-vehicle distance control area. The inter-vehicle distance with the leading traveling vehicle is obtained by communication, and velocity control is implemented to avoid interference or the like.

The range of the inter-vehicle distance control area 21 will be described. At the entrance 24 of the diverging lane, it may be difficult to detect an overhead traveling vehicle 14a diverging from the blocking area 20 by the optical distance sensor. Therefore, it is preferable to obtain the inter-vehicle distance by communication. Further, it may be difficult for an overhead traveling vehicle 14c in the middle of transition from straight movement to curving movement at the exit of the diverging lane, to detect a leading overhead traveling vehicle by the optical distance sensor. Therefore, likewise, it is preferable to obtain the inter-vehicle distance by communication. In contrast, the overhead traveling vehicle 14d at the exit 23 of the straight lane can detect the leading traveling vehicle by the optical distance sensor. Therefore, no inter-vehicle distance control area is required at the exit 23 of the straight lane. Further, the blocking area 20 is included in the inter-vehicle distance control area 21, and the overhead traveling vehicle 14a in the blocking area 20 obtains the position of the leading overhead traveling vehicle 14c by communication.

In the inter-vehicle distance control area 21 including the blocking area 20, each of the overhead traveling vehicles 14a to 14c obtains the distance to the leading overhead traveling vehicle by communication, and implements velocity control in accordance with the distance. When the overhead traveling vehicle enters the blocking area 20 from the entrance of the diverging lane, the overhead traveling vehicle obtains permission from the ground controller 12. When the overhead traveling vehicle exits the blocking area 20, the overhead traveling vehicle reports the current position and velocity to the ground controller 12, and the ground controller 12 detects that the blocking area 20 has become vacant.

Figure 3:
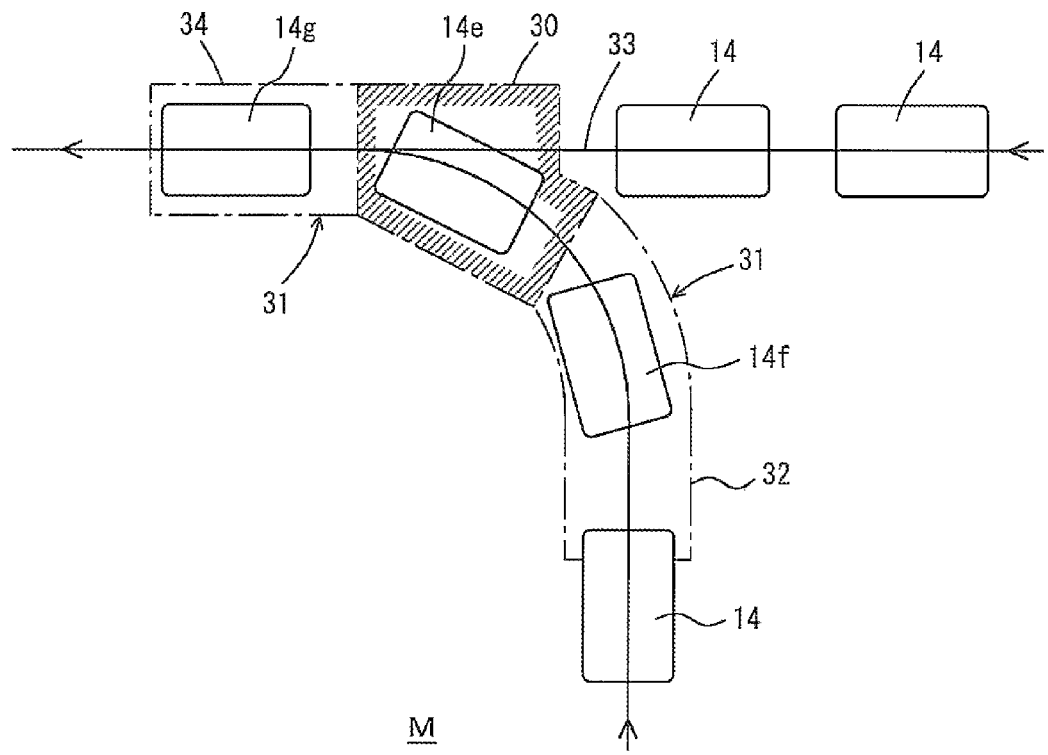
FIG. 3 is a diagram showing a blocking area and an inter-vehicle distance control area in a merging section in a preferred embodiment of the present invention.

FIG. 3 shows control in the merging section M. This control is commonly applicable to the merging sections M1 to M15. A reference numeral 30 denotes a blocking area. When the overhead traveling vehicle 14 enters the blocking area 30, permission from the ground controller 12 is required beforehand. An inter-vehicle distance control area 31 is present over an area including the blocking area 30, and is larger than the blocking area 30. The inter-vehicle distance control area 31 includes an area at the entrance 32 of a merging lane of the blocking area 30 and an area at the exit 34 of the blocking area 30. Since the entrance 32 of the merging lane is provided in a curve segment, the entrance 32 of the merging lane is included in the inter-vehicle control area 31. It should be noted that the entrance 33 of the straight lane of the blocking area 30 is not included in the inter-vehicle distance control area 31.

In each of the cases of FIG. 2 and FIG. 3, the length along the traveling path of the blocking area 20 or the blocking area 30 is substantially equal to the length of the vehicle body of the overhead traveling vehicle 14, and this length is the minimum size for avoiding interference between the 1 overhead traveling vehicles 14. Further, in the inter-vehicle distance control areas 21, 31, the overhead traveling vehicle 14 obtains the distance to the leading transportation vehicle by communication, and implements velocity control based on the distance to avoid interference. The entrance 33 of the straight lane of the blocking area 30 is not included in the inter-vehicle distance control area 31. It is because, in the presence of the blocking area 30, the traveling vehicle that has traveled in the straight segment can avoid interference with the leading traveling vehicle. Further, when the overhead traveling vehicle 14g that travels at the exit 34 of the merging lane comes from the entrance 32 of the merging lane, the leading traveling vehicle may not be detected until the vehicle body is oriented so as to be completely straight. Therefore, the exit 34 of the merging lane is included in the inter-vehicle distance control area 31.

Figure 4:
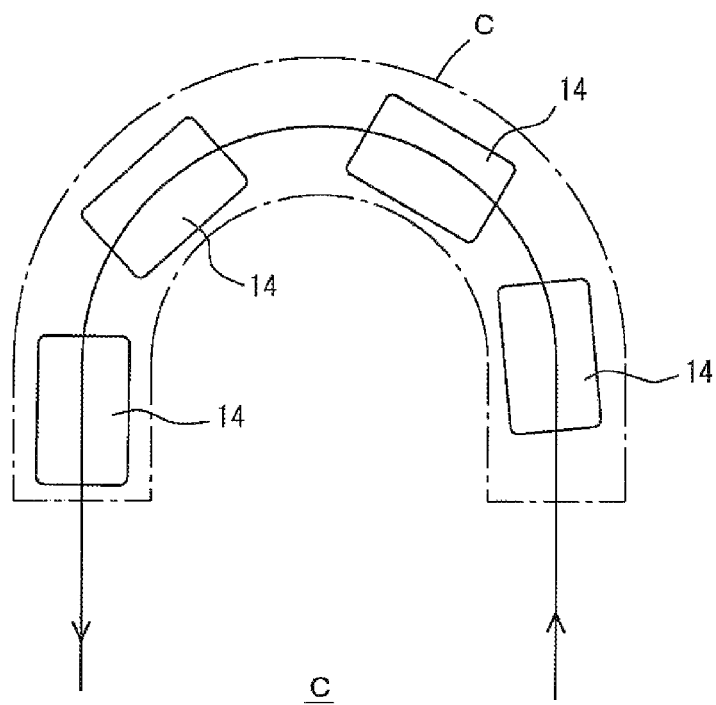
FIG. 4 is a diagram showing a curve segment in a preferred embodiment of the present invention.

FIG. 4 shows control in the curve segment C. In the straight segment, as described above, the overhead traveling vehicle 14 determines the distance to the leading transportation vehicle by the optical distance sensor to implement velocity control. In the curve segment C, since it may be difficult to detect the leading transportation vehicle by the optical distance sensor, the inter-vehicle distance is determined by communication to implement velocity control.

As a result of these operations, in the straight segment, basically, interference avoidance by the optical distance sensor is performed. In the curve segment, the diverging section, or the merging section, interference avoidance based on the inter-vehicle distance determined by communication is performed. Blocking control is implemented only in the minimum requisite range, i.e., in the blocking areas 20, 30. In general, since only one overhead traveling vehicle 14 can travel in one blocking area at one time, the size of the blocking area is inversely proportional to the number of overhead traveling vehicles 14 that can pass through the blocking area. In the present preferred embodiment, the number of overhead traveling vehicles 14 that can travel within the blocking area 20 or the blocking area 30 is increased to improve the throughput of the system 2.

Figure 5:
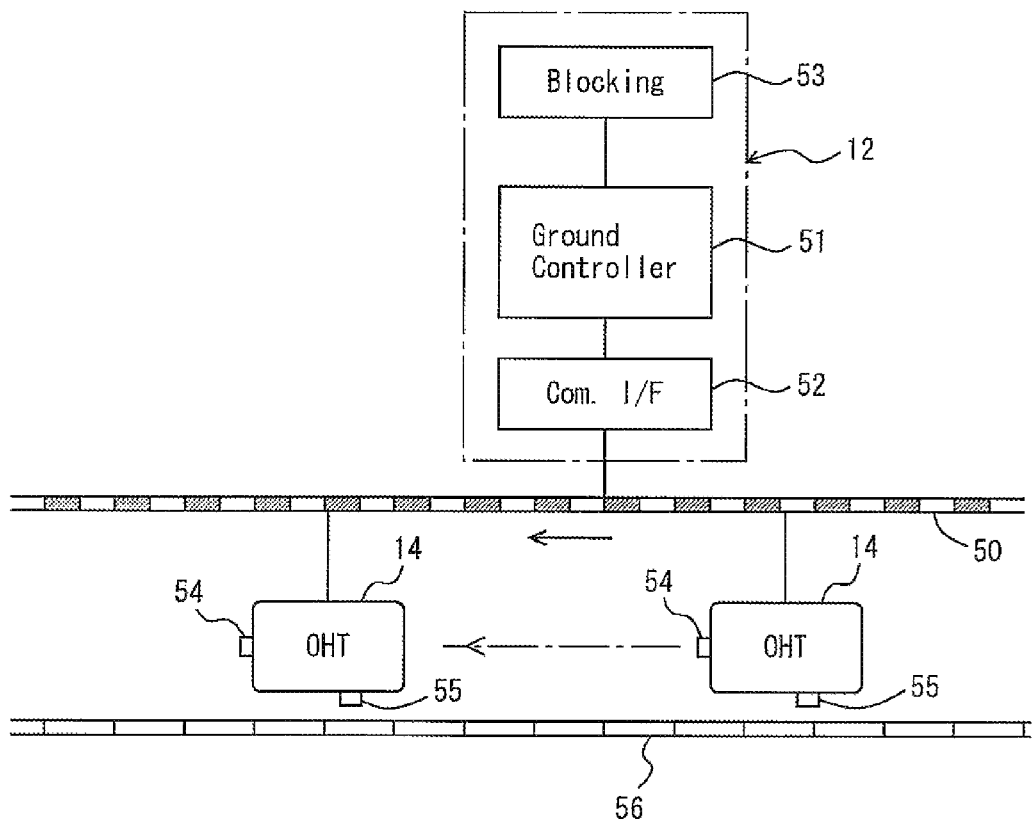
FIG. 5 is a diagram showing the relationship between a controller and overhead traveling vehicles in a preferred embodiment of the present invention.

FIG. 5 shows the relationship between the ground controller 12 and the overhead traveling vehicle 14. A reference numeral 50 denotes a wired or wireless LAN. For example, a feeder cable or a non-contact feeder cable may be included in a wired LAN. A wireless LAN may be adopted instead of the wired LAN. The ground controller 12 includes a communication interface and a blocking controller 53. The blocking controller 53 stores data as to whether the blocking area 20 or the blocking area 30 is occupied or not. When the blocking controller 53 receives permission requests from the overhead traveling vehicles 14, the blocking controller 53 issues travel permissions in accordance with a predetermined order.

In the areas other than the inter-vehicle control area, the overhead traveling vehicle 14 determines the inter-vehicle distance to the leading overhead traveling vehicle using an optical distance sensor 54 such as a laser distance sensor, for example. It should be noted that a supersonic distance sensor, a microwave distance sensor or the like may be used instead of the optical distance sensor. Marks 56 such as magnetic marks are provided along the travel rail or the like of the overhead traveling vehicle 14, and an absolute position sensor 55 is preferably used to detect the marks 56 for determining an absolute position of the overhead traveling vehicle 14. Alternatively, comb teeth like marks may be used as the marks 56. The overhead traveling vehicle 14 reports its own position and velocity determined by the absolute position sensor 55 to the ground controller 12 through the LAN 50. The overhead traveling vehicle 14 intercepts the current position and velocity of the other overhead traveling vehicle 14 to determine the inter-vehicle distance, and implement velocity control to avoid interference.

Figure 6:
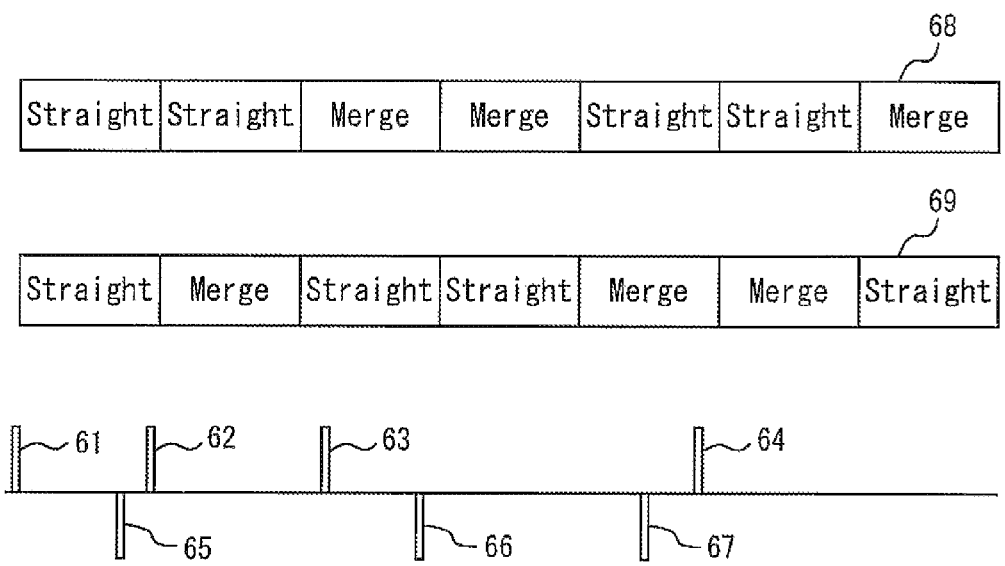
FIG. 6 is a diagram showing a pattern of traveling vehicles passing through the merging section in a preferred embodiment of the present invention.

FIG. 6 shows a pattern of permissions issued in response to blocking requests to the merging section M. There are two options for the merging section M, i.e., whether a priority is given to the overhead traveling vehicle coming from the merging lane or the overhead traveling vehicle coming from the straight lane. A reference numeral 69 denotes a velocity permission pattern in a conventional example. Permissions are given to travel permission requests in the order of the earliest reception. In contrast, a reference numeral 68 denotes a velocity permission pattern in the present preferred embodiment of the present invention. Permissions are preferentially given to permission requests coming from the same lane where permission has already been given.

As shown on the lower side of FIG. 6, it is assumed that permission requests 61 to 67 have reached the controller 12 separately. Reference numerals 61 to 64 denote permission requests from the straight lane, and reference numerals 65 to 67 denote permission requests from the merging lane. Since the blocking controller 53 firstly received the permission request 61 from the straight lane, the blocking controller 53 gives permission in response to the request, and performs blocking. It is assumed that the permission request 65 from the merging lane is received initially, and thereafter, the permission request 62 from the straight lane is received. In this case, a priority is given to the permission request 62 from straight lane where permission has been given to the previous request. In the absence of any other permission request before blocking for the permission request 62 is released, permission is given to the permission request 65 from the merging lane. Since the permission request 63 from the straight lane and the permission request 66 from the merging lane have reached before blocking for the permission request 65 is released, permission is given to the permission request 66 from the merging lane. After blocking for the permission request 66 is released, permission is given to the permission request 63 from the straight lane. In the meantime, if any permission request 67 from the merging lane is received, such a permission request is suspended, and a priority is given to the permission request 64 from the straight lane.

In the algorithm of processing, a priority is given to the permission request from the lane where permission has already been given to the previous permission request. In this manner, since permissions are given successively to permission requests from the same lane, the overhead traveling vehicles 14 can travel more efficiently in the blocking area 30.

In the present preferred embodiment of the present invention, the following advantages are obtained.

Since the sizes of the blocking areas 20, 30 are minimized, the number of overhead traveling vehicles 14 that can pass through the blocking areas 20, 30 per unit time is increased, and improvement in the transportation efficiency is achieved.

In the straight segment, since interference is avoided using the optical distance sensor 54, processing is simplified.

In the inter-vehicle distance control area such as the curve segment, the diverging section, and the merging section, reports of positions of overhead traveling vehicles to the controller are intercepted by communication to implement inter-vehicle distance control. In the system, in comparison with the case of adopting direct communication between the traveling vehicles 14, communication traffic of the LAN 50 is reduced.

In the merging section, blocking permissions are given preferentially to the overhead traveling vehicles that enter the merging section from the same lane. Therefore, the overhead traveling vehicles can travel through the merging section more efficiently.

It should be noted that the overhead traveling vehicle 14 reports its own position to the ground controller 12, and such a report may be made only in the inter-vehicle distance control areas 21, 31.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A traveling vehicle system comprising:
  a plurality of traveling vehicles;
  a travel route including at least one diverging section and at least one merging section; and
  at least one controller; wherein
  the traveling vehicles are arranged to travel along the travel route under control of the at least one controller;
  each of the plurality of traveling vehicles includes a first traveling vehicle position determining section arranged to determine a position of the respective traveling vehicle, a second traveling vehicle position determining section arranged to determine a position of at least one other of the traveling vehicles by communication, and a distance sensor arranged to detect a distance between the respective traveling vehicle and the at least one other of the traveling vehicles;
  an inter-vehicle distance control area in the travel route includes a blocking area, an entrance of a diverging section, an exit of a diverging lane of the diverging section, a curved entrance to the merging section, an exit from the merging section, and a curved segment;
  the blocking area includes the diverging section and the merging section;
  the at least one controller and the traveling vehicles are configured to control velocities of the traveling vehicles in the inter-vehicle distance control area by determining inter-vehicle distances between the traveling vehicles based on the position of the at least one other of the traveling vehicles obtained by the communication in the second traveling vehicle position determining section, and the position of the respective traveling vehicle determined by the first traveling vehicle position determining section, and to enter the blocking area after obtaining permissions from the controller;
  in areas of the travel route other than in the inter-vehicle distance control area, each of the plurality of traveling vehicles controls its own velocity based on distances detected by the distance sensor instead of the position of the at least one other of the traveling vehicles obtained by communication;
  a length of the blocking area is substantially equal to a length of a vehicle body of at least one of the plurality of traveling vehicles; and
  the length of the blocking area represents a minimum distance for avoiding interference between the traveling vehicles.

2. The traveling vehicle system according to claim 1, wherein the traveling vehicles are configured to request permissions from the at least one controller before entering into the merging section, the at least one controller being configured to provide permissions to allow entry of the traveling vehicles into the merging section, preferentially to traveling vehicles coming from a same direction regardless of an arrival order of the requests, to allow the traveling vehicles coming from the same direction to successively enter the merging section.

3. The traveling vehicle system according to claim 1, wherein marks are arranged along the travel route, and the first traveling vehicle position determining section is arranged to read the marks to recognize the position of the respective traveling vehicle determined in the first traveling vehicle position determining section;

each of the traveling vehicles further includes a communication section arranged to transmit a position of the respective traveling vehicle to the at least one controller; and the second traveling vehicle position determining section is arranged to intercept communication of the transmission by the communication section to the at least one controller to obtain the position of the at least one other of the traveling vehicles.

4. A travel control method in a traveling vehicle system for a plurality of traveling vehicles traveling along a travel route including at least one diverging section and at least one merging section under control of at least one controller, the method comprising the steps of:

designating an area of the travel route, including a diverging section and a merging section, as a blocking area;

designating an area including the blocking area, an entrance of the diverging section, an exit of a diverging lane of the diverging section, a curved entrance to the merging section, an exit from the merging section, and a curve segment as an inter-vehicle distance control area;

allowing the traveling vehicles to travel along the travel route, each of the traveling vehicles including a first traveling vehicle position determining section arranged to determine a position of the respective traveling vehicle, and a second traveling vehicle position determining section arranged to determine a position of at least one other of the traveling vehicles by communication, and a distance sensor arranged to detect a distance between the respective traveling vehicle and the at least one other of the traveling vehicles;

allowing the traveling vehicles in the inter-vehicle distance control area to determine inter-vehicle distances between the traveling vehicles from the position of the at least one other traveling vehicle obtained by the communication in the second traveling vehicle position determining section and the position of the respective vehicle determined by the first traveling vehicle position determining section to implement velocity control of at least one of the traveling vehicles to avoid interference with others of the traveling vehicles;

allowing the traveling vehicles to request permissions from the at least one controller before entering into the blocking area, and allowing the traveling vehicles to enter the blocking area after obtaining the requested permissions; and allowing each of the traveling vehicles in the travel route other than the inter-vehicle distance control area to control its own velocity based on the distance detected by the distance sensor instead of the position of the at least one other of the traveling vehicles obtained by communication, to avoid interference with the at least one other of the traveling vehicles; wherein a length of the blocking area is substantially equal to a length of a vehicle body of at least one of the plurality of traveling vehicles; and the length of the blocking area represents a minimum distance for avoiding interference between the traveling vehicles.

* * * * *